W. WEBB & W. W. HILDRETH.
WORK HOLDER ATTACHMENT FOR LATHE CHUCKS.
APPLICATION FILED FEB. 21, 1908.

917,387.

Patented Apr. 6, 1909.

WITNESSES:

INVENTORS:

Attorney

UNITED STATES PATENT OFFICE.

WILLIAM WEBB AND WARNIE W. HILDRETH, OF GLOVERSVILLE, NEW YORK.

WORK-HOLDER ATTACHMENT FOR LATHE-CHUCKS.

No. 917,387.  Specification of Letters Patent.  Patented April 6, 1909.

Application filed February 21, 1908. Serial No. 417,148.

*To all whom it may concern:*

Be it known that we, WILLIAM WEBB and WARNIE W. HILDRETH, citizens of the United States, residing at Gloversville, in the county of Fulton and State of New York, have invented certain new and useful Improvements in Work-Holder Attachments for Lathe-Chucks; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in attachments for lathes and comprises a work-holder designed to be detachably held upon a lathe chuck, affording means whereby a finished piece of work may be held by the device without marring the same.

The invention comprises various details of construction, combinations and arrangements of parts, which will be hereinafter fully described and then specifically defined in the appended claim.

Our invention is illustrated in the accompanying drawings, in which:—

Figure 1:
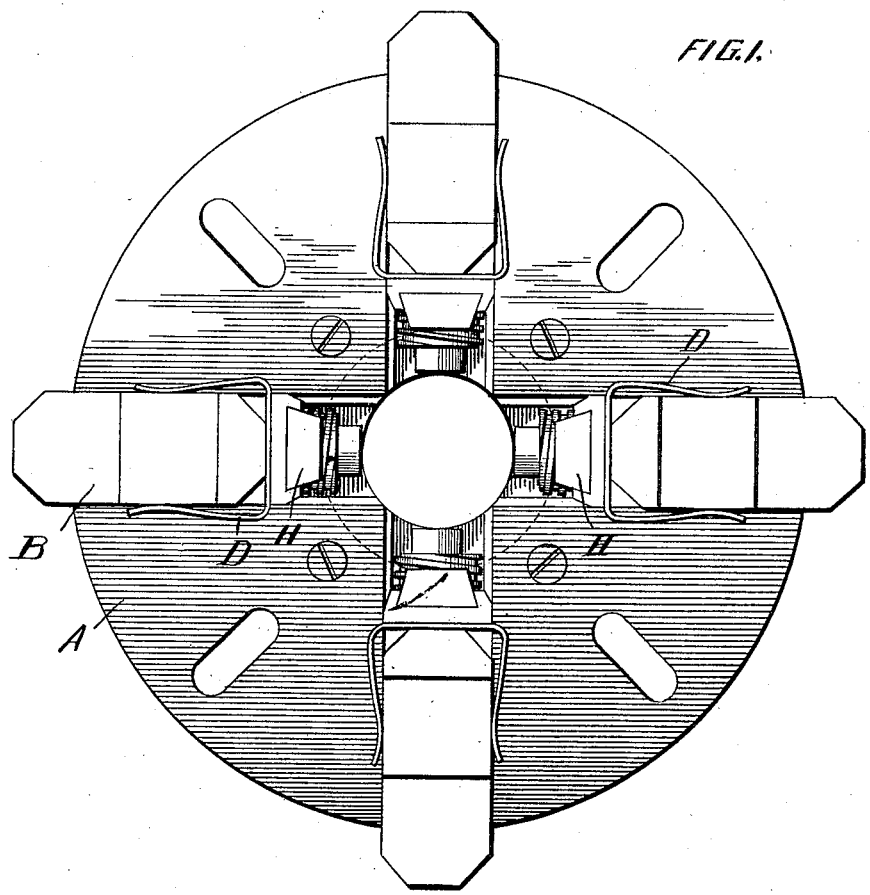
Figure 2:
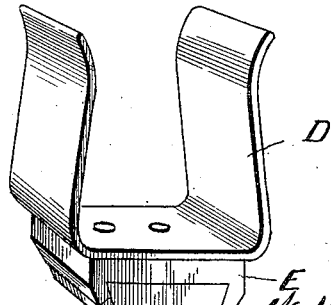

Figure 1 is a plan view showing our improved work-holder as applied to the chucks thereof, and Fig. 2 is a detail perspective of one of the work holding devices.

Reference now being had to the details of the drawings by letter, A designates a chuck adapted to be attached to the spindle of a lathe and having the jaws B over each of which one of our improved work holding devices is designed to be held.

In Fig. 1 of the drawings, we have illustrated four of the work-holders, one adapted to each of the jaws and each holder comprises a clip D which is bent to form two wings which are designed to engage frictionally the opposite sides of a jaw B, said wings being sufficiently resilient to securely retain the holder in place.

E designates a metallic plate which is fastened in any suitable manner to said spring and is provided with a dove-tailed recess E', designed to receive the block H made of any suitable material, such as brass, fiber or copper, the latter mentioned metal proving very satisfactory. Said block, it will be noted upon reference to the drawings, has its opposite edges beveled and designed to have dove-tail connections with the block E in which it is securely held by friction.

When it is desired to adjust the work-holders upon the chucks, the spring clips are made to engage jaws of the chucks in the manner shown in Fig. 1 of the drawings, leaving four contact blocks H for engagement with the article to be held. When the work-holders are not in use, they may be removed, as will be readily understood.

From the foregoing, it will be noted that, by the provision of the work holding devices as shown and described, a simple and efficient means is afforded for attachment to the jaws of the chucks of a lathe whereby finished work may be held in the lathe without marring, bruising or injuring in any way the article held while boring or turning with the lathe.

What we claim to be new is:—

A work-holder for lathes comprising a metallic plate provided with a dove-tailed recess, a wear block having dove-tail connection therewith, the outer face of said block extending beyond the recessed faces of the plate, a resilient clip fastened to said plate and adapted to frictionally engage opposite faces only of the jaw of a lathe chuck, as set forth.

In testimony whereof we hereunto affix our signatures in the presence of two witnesses.

WILLIAM WEBB.
WARNIE W. HILDRETH.

Witnesses:
ALBERT HERTZ,
WILLIAM A. MACDONALD.